(12) United States Patent
Matsuo et al.

(10) Patent No.: US 7,745,037 B2
(45) Date of Patent: Jun. 29, 2010

(54) MEMBRANE ELECTRODE ASSEMBLY FOR SOLID POLYMER ELECTROLYTE FUEL CELL

(75) Inventors: Junji Matsuo, Saitama (JP); Kaoru Fukuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1266 days.

(21) Appl. No.: 11/265,463

(22) Filed: Nov. 1, 2005

(65) Prior Publication Data
US 2006/0093893 A1 May 4, 2006

(30) Foreign Application Priority Data
Nov. 4, 2004 (JP) ............... 2004-320269

(51) Int. Cl.
*H01M 4/96* (2006.01)
(52) U.S. Cl. ............... 429/44; 429/30; 429/40
(58) Field of Classification Search ............ 429/40, 429/44, 30
See application file for complete search history.

(56) References Cited

U.S. PATENT DOCUMENTS

2002/0051903 A1* 5/2002 Masuko et al. ............ 429/44
2003/0194598 A1* 10/2003 Chan ..................... 429/40
2006/0188717 A1* 8/2006 Kambara et al. .......... 428/367

FOREIGN PATENT DOCUMENTS

| JP | 2000-268828 | 9/2000 |
|---|---|---|
| JP | 2001-357857 | 12/2001 |
| JP | 2002-015745 | 1/2002 |
| JP | 2003-036859 | 2/2003 |
| JP | 2003-115302 | 4/2003 |
| JP | 2003-201417 | 7/2003 |
| WO | 01/92151 | 12/2001 |
| WO | 02/15303 | 2/2002 |

* cited by examiner

*Primary Examiner*—Jane Rhee
(74) *Attorney, Agent, or Firm*—Fish & Richardson P.C.

(57) ABSTRACT

A membrane electrode assembly for a solid polymer electrolyte fuel cell includes an anode electrode, a cathode electrode, and a polymer electrolyte membrane sandwiched by the electrodes, the catalyst layer of the cathode electrode containing a catalyst supporting particle in which a precious metal is supported on heat-treated carbon black or activated carbon, an ion conductive material, and a crystalline carbon fiber. Heat treatment is preferably applied at 2,500 to 3,000° C. (degrees Celsius).

The membrane electrode assembly provides superior power generation performance.

7 Claims, 1 Drawing Sheet

MEMBRANE ELECTRODE ASSEMBLY FOR SOLID POLYMER ELECTROLYTE FUEL CELL

CROSS-REFERENCE TO RELATED APPLICATIONS

Priority is claimed on Japanese Patent Application No. 2004-320269, filed Nov. 4, 2004, the content of which is incorporated herein by reference.

BACKGROUND OF THE INVENTION

1. Field of the Invention

The present invention relates to a membrane electrode assembly for a solid polymer electrolyte fuel cell, and in particular, relates to a membrane electrode assembly which provides high output with a graphitized catalyst.

2. Description of Related Art

Fuel cells use hydrogen gas as a fuel gas and generate energy by an electrochemical reaction of hydrogen and oxygen. There are various types of fuel cells, including a phosphoric acid fuel cell, a molten carbonate fuel cell, a solid electrolyte type fuel cell, and a solid polymer electrolyte fuel cell. Among these, a solid polymer electrolyte fuel cell can start operation at a normal temperature and can also provide higher output with a small structure, and it thus holds great promise as a power source for two-wheeled or four-wheeled vehicles, or as a portable power supply. In the case in which such a solid polymer electrolyte fuel cell is actually used, an electrode structure, which is a basic unit of a fuel cell, is held between separators to form a single cell, and then several tens to hundreds of single cells are combined from a stack (battery).

A single cell generally includes an anode electrode and a cathode electrode that are provided with a diffusion layer and a catalyst layer, a membrane electrode assembly (MEA) that is formed from a polymer electrolyte membrane sandwiched by these electrodes, and a separator that sandwiches this membrane electrode assembly.

The catalyst layer contains catalyst supporting particles in which a catalyst metal is supported on a carrier. As a means for improving the durability of this catalyst layer, it is disclosed that the durability of the catalyst carrier is improved by previously applying high temperature heat processing to a carrier. In addition, carbon is usually used as a catalyst carrier; however, it is also disclosed that water repellency and the anti-corrosion characteristics of the catalyst layer are improved by applying heat treatment to the carbon to be graphitized. (For example, see Patent Documents 1 to 4)

Patent Document 1
   Japanese Patent Application Laid-Open No. 2000-268828

Patent Document 2
   Japanese Patent Application Laid-Open No. 2001-357857

Patent Document 3
   Japanese Patent Application Laid-Open No. 2002-015745

Patent Document 4
   Japanese Patent Application Laid-Open No. 2003-036859

According to Patent Documents 1 to 4, it is disclosed that durability is improved by using graphitized carbon as a catalyst layer. However, when carbon black whose specific surface area is 300 $m^2/g$ or more is heat-treated as a graphitized catalyst carrier, in particular, when it is heat-treated at 2,500° C. (degrees Celsius) or more, the specific surface area is greatly reduced. Therefore, when a precious metal catalyst supports platinum or a platinum alloy, sufficient power generation performance cannot be obtained.

In addition, when carbon black is graphitized by high temperature heat processing, a sintering of carbon particles occurs, and then a large and firm aggregate having a diameter of 10 μm (micrometers) or more is formed. When a membrane electrode assembly is formed, an aggregate like this alters a polymer electrolyte membrane and reduces the durability. Furthermore, the thickness of an electrode catalyst layer becomes uneven, and generating efficiency is reduced.

Conventionally, while there has been an advantage in that durability can be improved by applying heat treatment to carbon black, there has been a problem in that performance as a catalyst is adversely reduced because the reduction or the flocculation of the specific surface area occurs by heat treatment.

SUMMARY OF THE INVENTION

The present invention has been made in view of the above-mentioned problems, and an object of the present invention is to provide a membrane electrode assembly of a solid polymer electrolyte fuel cell that can yield superior generating performance, in particular when carbon black to which high temperature heat processing has been applied at 2,500° C. (degrees Celsius) is used as a catalyst carrier.

More specifically, the present invention provides the following:

(1) A membrane electrode assembly of a solid polymer electrolyte fuel cell including an anode electrode, a cathode electrode, and a polymer electrolyte membrane that is sandwiched by these electrodes; both the electrodes are formed from a catalyst layer close against the polymer electrolyte membrane, and a gas diffusion layer close against the catalyst layer, and the catalyst layer of the cathode electrode contains a catalyst supporting particle in which a precious metal is supported on heat-treated carbon black or activated carbon, an ion conductive material, and crystalline carbon fibers.

According to the first aspect of the invention, the catalyst layer of the cathode electrode side contains carbon black or activated carbon that is graphitized by applying heat treatment, so that an electrode layer, which hardly deteriorates by burning, is formed. Accordingly, high power generation performance can be obtained. In addition, by adding crystalline carbon fibers in the catalyst layer, even if the surface area of carbon black or activated carbon that is graphitized decreases, the pore volume of the electrode layer can be increased. Furthermore, by adding crystalline carbon fibers, electrode resistance decreases and calorific value decreases so that excessive thermal energy provided to the carrier is controlled, and then progress of oxidation corrosion reaction can also be controlled. As a result of combining the heat-treated carrier with crystalline carbon fibers, durability of the catalyst layer can be improved, and also reduction of the specific surface area and development of flocculation by heat treatment can be effectively prevented, so that performance as a catalyst can be maintained for a long time.

In addition, "carbon black or activated carbon that is heat-treated" in the present specification means carbon black or activated carbon that is graphitized; however, "graphitized" does not means of the perfectly crystallized state in which carbon black or activated carbon is perfectly graphitized, but a state in which the crystallization has partially progressed. More specifically, it is preferred that the [002] mean lattice plane spacing in the X-ray diffraction measurement be 0.340 to 0.349 nm (nanometer). In addition, the crystalline carbon fiber means a whisker-shaped fiber with a high completeness as a crystal, for example, it is a concept that includes a true whisker of a monocrystal, a pseudo-whisker of polycrystal, carbon nanotube, etc.

(2) The membrane electrode assembly of the solid polymer electrolyte fuel cell according to the first aspect of the invention, the crystalline carbon fibers are filamentous carbon fibers.

According to invention the second aspect of the invention, crystalline carbon fibers are filamentous carbon fibers, so that pore distribution or pore volume in a catalyst can be easily adjusted.

(3) The membrane electrode assembly of the solid polymer electrolyte fuel cell according to the first aspect of the invention, for crystalline carbon fibers, the mean lattice plane spacing of the [002] plane is 0.69 nm (nanometer) or less, the fiber diameter is 0.1 to 0.5 μm (micrometers), the fiber length is 10 to 40 μm (micrometers), the bulk density is 0.02 to 0.10 g/cm$^3$, the specific surface area is 5 to 20 m$^2$/g, and the specific resistance is 0.025 Ω·cm (ohm-cm) or less.

According to the third aspect of the invention, by providing a fiber diameter, a fiber length, etc., of the crystalline carbon fiber as the above-mentioned physical properties, when catalyst supporting particles and an electrode layer are formed, desirable pore distribution and pore volume can be adjusted so that high power generation performance and long service life can be obtained. According to this, a solid polymer electrolyte fuel cell having a high initial performance and a superior service life can be provided.

(4) The membrane electrode assembly of the solid polymer electrolyte fuel cell according to the first aspect of the invention may be one in which the content of the crystalline carbon fiber is 20 to 60% by mass relative to the overall of the catalyst supporting particle.

According to the fourth aspect of the invention, the catalyst layer to which is added crystalline carbon fiber has pores in order to facilitate water discharge. Thus, the content of the crystalline carbon fiber is set to 20% or more by mass so that water that is produced by reaction of hydrogen and oxygen can be effectively drained from the catalyst layer. Therefore, flooding due to electricity generation can be effectively prevented and high power generation performance can be provided. In addition, when the content exceeds 60% by mass, a reduction of a gas supply or water discharge characteristic unfavorably occurs by an increase of the thickness of an electrode.

(5) The membrane electrode assembly of the solid polymer electrolyte fuel cell according to the first aspect of the invention may be one in which the carbon black or activated carbon is heat-treated in the range of 3,000 to 2,500° C. (degrees Celsius).

According to the fifth aspect of the invention, considering that the graphitization start temperature of carbon is about 2,500° C. (degrees Celsius), the heat treatment temperature is set 3,000 to 2,500° C. (degrees Celsius), so that heat treatment can progress without completely graphitizing carbon.

(6) The membrane electrode assembly of the solid polymer electrolyte fuel cell according to the first aspect of the invention may be one in which the specific surface area is 300 to 1,600 m$^2$/g before the carbon black or activated carbon is heat-treated, it is 160 m$^2$/g or less after it is heat-treated, and the reduction rate of the specific surface area before and after it is heat-treated is 80% or more.

According to the sixth of the invention, the specific surface area of a carrier is set in the above-mentioned range so that high power generation performance and durability can be provided.

(7) The membrane electrode assembly of the solid polymer electrolyte fuel cell according to the first aspect of the invention may be one in which the [002] mean lattice plane spacing of the carbon black or activated carbon is 0.340 to 0.349 nm (nanometer) and one or two crystallization peaks exist between 24 to 28 in 2θ/degree (theta/degree), in the X-ray diffraction measurement.

According to the seventh aspect of the invention, the result of an X-ray diffraction measurement is set to the above-mentioned range so that the specific surface area of the sixth aspect of the spacing can be obtained. As a result, high power generation performance and durability can be obtained. In addition, in the case of complete graphite, the [002] mean lattice plane spacing is 0.335 nm (nanometer).

(8) The membrane electrode assembly of the solid polymer electrolyte fuel cell according to the first aspect of the invention may be one in which the precious metal is platinum or a platinum alloy, and the support rate of the precious metal for all mass of the catalyst supporting particle is 40 to 60% by mass, the particle size of the supported platinum or platinum alloy is 2 to 5 nm (nanometer), the specific surface area is 75 to 100 m$^2$/g, and one or two crystallization peaks exist between 24 to 28 in 2θ/degree (theta/degree) in the X-ray diffraction measurement.

According to the eighth aspect of the invention, a support rate, particle size and specific surface area of platinum or a platinum alloy are set in the above-mentioned range and also the result of an X-ray diffraction measurement is set in the above-mentioned range, so that high power generation performance and durability can be obtained.

(9) The membrane electrode assembly of the solid polymer electrolyte fuel cell according to the first aspect of the invention may be one in which the metal surface area is 40 to 120 m$^2$/g when the precious metal supports platinum or a platinum alloy.

According to the ninth aspect of the invention, the metal surface area is set in the above-mentioned range when platinum or a platinum alloy is supported, so that high power generation performance and durability can be provided.

(10) The membrane electrode assembly of the solid polymer electrolyte fuel cell according to the first aspect of the invention, for the catalyst layer of the cathode electrode, the volume of the pore whose diameter size is 0.01 to 2.0 μm (micrometers) is 2.8 μl/cm$^2$/mg·metal (microliter/cm$^2$/mg·metal) or more, and the volume of the pore whose diameter size is 0.01 to 0.15 μm (micrometers) is 1.7 μl/cm$^2$/mg·metal (microliter/cm$^2$/mg·metal) or more.

According to the tenth aspect of the invention, the pore volume of the catalyst layer is set in the above-mentioned range so that high power generation performance and durability can be provided.

According to the present invention, by applying heat treatment to a carrier of a catalyst layer of a cathode electrode side, and also by adding crystalline carbon fibers in the catalyst layer, a membrane electrode assembly of a solid polymer electrolyte fuel cell that provides high power generation performance and has superior durability can be provided.

DESCRIPTION OF THE PREFERRED EMBODIMENTS

Hereinafter, the present invention will be described with reference to the Figures.

Overall Structure

Figure 1:
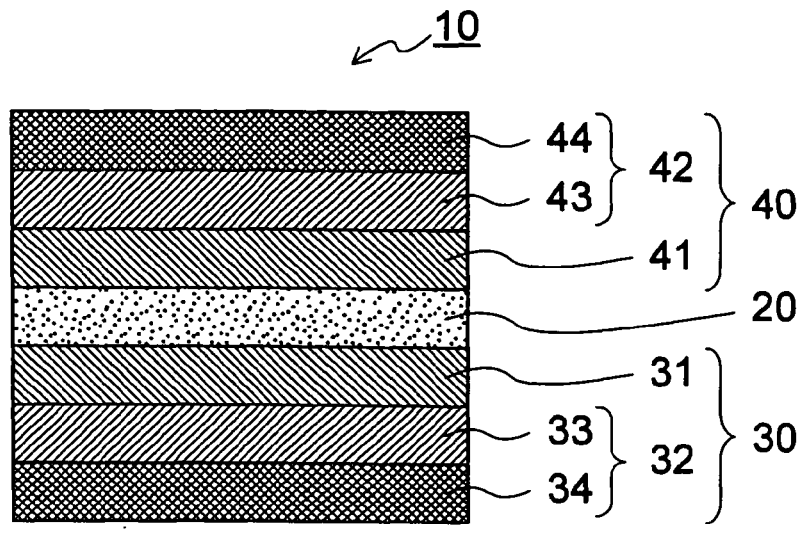
FIG. 1 is a sectional view showing a single cell which constitutes the solid polymer electrolyte fuel cell according to the present invention.

FIG. 1 is a sectional view of an embodiment of membrane electrode assembly 10 which is the basic structural unit of the solid polymer electrolyte fuel cell. As shown in FIG. 1, membrane electrode assembly 10 includes anode electrode 30, cathode electrode 40, and polymer electrolyte membrane 20 sandwiched by these electrodes. Anode electrode 30 is formed from catalyst layer 31 closes against polymer electrolyte membrane 20 and gas diffusion layer 32 closes against this catalyst layer 31. In addition, cathode electrode 40 is formed from catalyst layer 41 closes against polymer electrolyte membrane 20 and gas diffusion layer 42 closes against this catalyst layer 41.

Polymer Electrolyte Membrane

Polymer electrolyte membrane 20 is formed from a polymer electrolyte, and in particular, the polymer electrolyte, in which a fluoropolymer has at least part of the polymer skeleton being fluorinated or hydrocarbon polymer containing no fluorine in the polymer skeleton, is preferably provided with an ion exchange group. The types of the ion exchange group are not limited, although they are appropriately selected according to the specific application. For example, a polymer electrolyte, which is provided with at least one ion exchange group such as sulfonic acid, carboxylic acid, phosphonic acid or the like, can be used.

A fluoropolymer electrolyte in which at least part of the polymer skeleton is fluorinated, as a polymer electrolyte provided with an ion exchange group, a perfluorocarbon sulfonic acidic polymer such as Nafion®, perfluorocarbon phosphonic acidic polymer, trifluorostyrene sulfonic acidic polymer, ethylene tetrafluoro ethylene-g-styrene sulfonic acidic polymer, etc. Among these, Nafion is preferably used.

A hydrocarbonic polymer, in which no fluoride is contained, as a polymer electrolyte provided with an ion exchange group, specifically includes polysulfonic acid, polyarylether ketone sulfonic acid, polybenzimidazolen alkylphosphonic acid, etc.

Catalyst Layer of Cathode Electrode

The catalyst layer 41 of the cathode electrode contains a catalyst supporting particle in which a precious metal is supported on heat-treated carbon black or activated carbon, which is referred to simply as the "carrier" hereafter, an ion conductive material, and a crystalline carbon fiber.

Carrier of Catalyst Supporting Particle

Heat-treated carbon black or activated carbon is used as a carrier of catalyst supporting particles. It is preferred that this carbon black or activated carbon be heat-treated in the range 2,500 to 3,000° C. (degrees Celsius). Considering that the graphitization start temperature of carbon is about 2,500° C. (degrees Celsius), the heat treatment temperature of less than 2,500° C. (degrees Celsius) is unfavorable because crystallization does not progress, and also the heat treatment temperature more than 3,000° C. (degrees Celsius) is unfavorable because crystallization excessively progresses so that surface area decreases and also pore volume decreases.

In addition, for the carrier, it is preferred that the specific surface area be 300 to 1,600 $m^2/g$ before heat treatment and 160 $m^2/g$ or less after heat treatment, and the reduction rate of the specific surface area before/after heat treatment be 80% or more. In addition, the specific surface area can be measured by the conventional well-known one-point method or multi-point method.

In addition, for the carrier, it is preferred that the [002] mean lattice plane spacing be 0.340 to 0.349 nm (nanometer) and that there be one or two crystallization peaks between 24 to 28 in 2θ/degree (theta/degree), in the X-ray diffraction measurement. In addition, as described above, for the carrier, it is preferred that carbon black or activated carbon be used which is graphitized by applying high temperature heat processing previously and pulverized into 10 μm (micrometers) or less. Catalyst Metal of Catalyst Supporting Particles A precious metal to be used for a catalyst metal is not particularly limited, and thus conventional well-known gold, platinum, platinum alloy, etc., are able to be used. Especially, platinum or a platinum alloy is preferable. As a platinum alloy, platinum-ruthenium (Pt—Ru) alloys can preferably be exemplified.

It is preferred that the support rate of the precious metal versus the overall mass of catalyst supporting particles be 40 to 60% by mass. It is unfavorable when the support rate is less than 40% by mass, because an electrode layer excessively thickens so that a gas supply or water discharge characteristic deteriorates. Furthermore, it is unfavorable when the support rate exceeds 60% by mass because a precious metal particle diameter becomes so large that catalytic activity falls.

In addition, it is preferred that a particle size of platinum or platinum alloy after the support be 2 to 5 nm (nanometer) and a specific surface area be 75 to 100 $m^2/g$. Furthermore, it is preferred that there be one or two crystallization peaks between 24 to 28 in 2θ/degree (theta/degree) in the. X-ray diffraction measurement.

Furthermore, it is preferred that a metal surface area be 40 to 120 $m^2/g$ when platinum or a platinum alloy is supported. It is unfavorable when a metal surface area is less than 40 $m^2/g$ because activity deteriorates with an increase in particle diameter, and also a metal surface area exceeds 120 $m^2/g$ because a particle diameter excessively small so that sintering occurs during power generation endurance and then performance deteriorates. In addition, a metal surface area can be measured by the conventional well-known pulse-type CO adsorption method.

Crystalline Carbon Fiber As a crystalline carbon fiber, a filamentous carbon fiber that is represented by what is called a whisker fiber and has crystallinity is preferably used. In particular, such a fiber, which has physical properties shown in the following Table 1, can be exemplified. In addition, such a crystalline carbon fiber may use commercially available material (for example, VGCF produced by Showa Denko K.K.).

TABLE 1

| Item | Range | Unit |
| --- | --- | --- |
| plane spacing | 0.345≧ | nm |
| Fiber diameter | 0.1~0.5 | μm |
| Fiber length | 10~40 | μm |
| Bulk density | 0.02~0.10 | $g/cm^3$ |
| True density | 1.8 or more | $m^2/g$ |
| Specific surface area | 5~20 | $m^2/g$ |
| Specific resistance | 0.025≧ | Ω · cm |
| Hygroscopicity | 0.5> | % |
| Volatile content | 0.3> | % |
| Ash content | 0.05> | % |
| pH | 7 | — |
| Oxidization temperature | >550 | ° C. |

This crystalline carbon fiber is preferably mixed at the rate of 20 to 60% by mass against a catalyst supporting particle, so that the moderate volume of a pore is formed in catalyst layer 41 thereby. The rate of 20% by mass is unfavorable, because the formation of pores is insufficient so that water produced by reaction cannot effectively be drained from the catalyst layer.

For the formation of a pore in catalyst layer 41, it is preferred that the volume of a pore with diameter of 0.01 to 2.0 μm (micrometers) be 2.8 microliter/cm$^2$/mg or more, and the volume of a pore with diameter size of 0.01 to 0.15 μm (micrometers) be 1.7 microliter/cm$^2$/mg or more.

Ion Conductive Material

The ion conductive material is formed from a polymer electrolyte, and the polymer electrolyte similar to polymer electrolyte membrane 20 is preferably used.

Catalyst Layer of Anode Electrode

Catalyst layer 31 of an anode electrode has a structure similar to a catalyst layer, and contains an ion conductive material and a catalyst in which a metal such as platinum is supported on a carrier such as carbon. The ion conductive material is formed from a polymer electrolyte, and a similar polymer electrolyte, which is used for electron membrane 20 or catalyst layer 41 of the cathode electrode, is preferably used. For the catalyst, a catalyst in which platinum is supported on carbon, a Pt—Ru catalyst in which alloys of platinum and ruthenium supported on carbon, etc., can be used.

Gas Diffusion Layer

Gas diffusion layer 32 of an anode electrode side and gas diffusion layer 42 of a cathode electrode side may have a similar structure to a typical conventional gas diffusion layer, and in the embodiment of FIG. 1, gas diffusion layer 32 of the anode electrode side is formed from a carbon Teflon layer 33 close against catalyst layer 31 and carbon paper layer 34 close against this carbon Teflon layer 33. Gas diffusion layer 42 of a cathode electrode side is formed from a carbon Teflon layer 43 close against catalyst layer 41, and carbon paper layer 44 closes against this carbon Teflon layer 43.

Carbon paper layers 34 and 44 are porous substrates of current collecting materials, and a conventional well-known carbon paper can be used. In addition, a carbon paper, whose surface is water-repellent finishing may be used. Carbon Teflon layers 33 and 43 are layers that contain a granular water-repellent resin such as Teflon® and carbon particles.

Gas diffusion layer 32 and 42 are not limited to the above-mentioned structure; however, gas diffusion layer 32 of the anode electrode side can be a structure in which hydrogen gas for fuel can equally reach catalyst layer 31. Gas diffusion layer 42 of the cathode electrode side can be a structure that air containing oxygen gas can equally reach catalyst layer 41. In addition, the gas diffusion layers of the anode electrode side and the cathode electrode side may or may not have the same structure.

Manufacturing Method

A manufacturing method for a membrane electrode assembly of the present embodiment is as follows:

First a carrier is supported by catalyst metals, and then catalyst supporting particles are provided. At this time, a carrier of a catalyst supporting particle is previously heat-treated at 2,500 to 3,000° C. (degrees Celsius). Second, this carrier is cracked in a solvent such as water, etc., to form primary particles, and then dried. In addition, before heat treatment, the catalyst metal may be supported on the carrier. Third, this catalyst supporting particle, an ion conductive substance and crystalline carbon fibers are mixed at the above predetermined ratio, and a cathode catalyst paste is provided. Fourth, conventionally well-known catalyst supporting particles and an ion conductive substance are mixed at a predetermined ratio, and an anode catalyst paste is provided.

The provided anode catalyst paste and cathode catalyst paste are applied to a Teflon sheet, etc., preferably so that the coating amount is 0.05 to 0.7 mg/cm$^2$. According to this, an anode electrode sheet and cathode electrode sheet can be provided. Fifth, polymer electrolyte membrane 20 is sandwiched by the anode electrode sheet and the cathode electrode sheet which are well dried, and then a composite (CCM) of polymer electrolyte membrane 20 and a catalyst layer are provided by decal transferring (decalcomania process).

Sixth, on a carbon paper, a paste in which polytetrafluoroethylene particles and carbon black particles are mixed at a prescribed ratio in solvent is applied and dried, and a pair of gas diffusion sheets of a cathode electrode and an anode electrode is provided.

Finally, after CCM is sandwiched with one pair of the above-mentioned gas diffusion sheets so that a carbon paper is laterally located, by unifying with a hot pressing of 130 to 160° C. (degrees Celsius), a membrane electrode assembly (MEA) can be provided.

EXAMPLES

The present invention is explained based on Examples in further detail, but is not limited to the Examples. Preparation of Catalyst Layer of Cathode Electrode Side Carbon black (ketjenblack EC produced by Cabot Corp.) was graphitized by applying heat treatment at 2,800° C. (degrees Celsius), $d_{002}$ of a powder of 0.344 nm (nanometer) were provided, 10 g of graphitized supported catalyst that was a platinum supported on carbon at the mass ratio 1:1, 35 g of 20% Nafion solution (DE2020 produced by Du Pont Kabushiki Kaisha) and 1.7 g of crystalline carbon fiber (VGCF-G produced by Showa Denko K.K.) were mixed, and then a cathode electrode paste was prepared. This cathode electrode paste was applied on a Teflon® sheet so that a platinum amount was 0.5 mg/cm$^2$, and a cathode electrode sheet was provided.

Preparation of Catalyst Layer of Anode Electrode Side 10 g of Catalyst supporting particles (TEC61E54 produced by Tanaka Kikinzoku Kogyo K.K.) that supports a Pt—Ru catalyst and 40 g of an ion conductive polymer (Nafion® SE2021 produced by DU Pont Kabushiki Kaisha) were mixed, and an anode electrode paste was prepared. This anode electrode paste was applied on a Teflon® sheet so that the catalyst metal amount was 0.15 mg/cm$^2$ and dried, and then an anode electrode sheet was provided.

Preparation of Construction of Composite (CCM)

A perfluorocarbon sulfonic acidic polymer ("Nafion" DE2021 produced by DU Pont Kabushiki Kaisha), which was a polymer electrolyte membrane, was sandwiched by the anode electrolyte sheet and the cathode electrolyte sheet. Subsequently, the polymer was transferring by the decal method (decalcomania process: combining pressure of 40 kg/cm$^2$), and then a composite of a polymer electrolyte membrane and a catalyst layer was prepared.

Preparation of Gas Diffusion Layer Sheet 12.0 g of Teflon dispersion (L170J produced by Asahi Glass Co., Ltd.) and 18.0 g of carbon black (Vulcan XC75 produced by Cabot Corp.) were mixed in 50 g of ethylene glycol, and then a foundation layer paste was provided. This foundation layer paste was applied on a carbon paper (TGP060 produced by Toray Industries, Inc.) which was previously water-repellent processed with Teflon dispersion (FEP120J produced by Mitsui Du Pont Chemical) and dried so that the foundation layer paste was 2.3 mg/cm$^2$ to form a layer, and then two gas diffusion layer sheets for the anode electrode and cathode electrode were provided.

Preparation of Membrane Electrode Assembly (MEA)

A composite (CCM) of a membrane and catalyst layer was sandwiched by diffusion layer sheets, and transferred on an electrolyte membrane by the decal method at a pressure of 30 kg/cm$^2$ at 140° C. (degrees Celsius), and a membrane electrode assembly (MEA) was prepared.

Example 2

Except that the heat treatment temperature of the carbon black was set to 2,500° C. (degrees Celsius), a membrane electrode assembly (MEA) was prepared in a similar way as in Example 1.

Example 3

Except that the addition amount of crystalline carbon fibers was set to 2.5 g, a membrane electrode assembly (MEA) was prepared in a similar way as in Example 1.

Example 4

Except that the heat treatment temperature of the carbon black was set to 1,800° C. (degrees Celsius), a membrane electrode assembly (MEA) was prepared in a similar way as in Example 1.

Comparative Example 1

Except that no crystalline carbon fibers were mixed, a membrane electrode assembly (MEA) was prepared in a similar way as in Example 1.

Evaluation

Subsequently, the physical properties of the membrane electrode assemblies as in the above-mentioned Examples 1 to 5 and Comparative Example 1 were examined. In addition, the produced membrane electrode assembly was sandwiched by a pair of separators to form a single cell, and then evaluations were conducted on the single cell.

Figure 2:
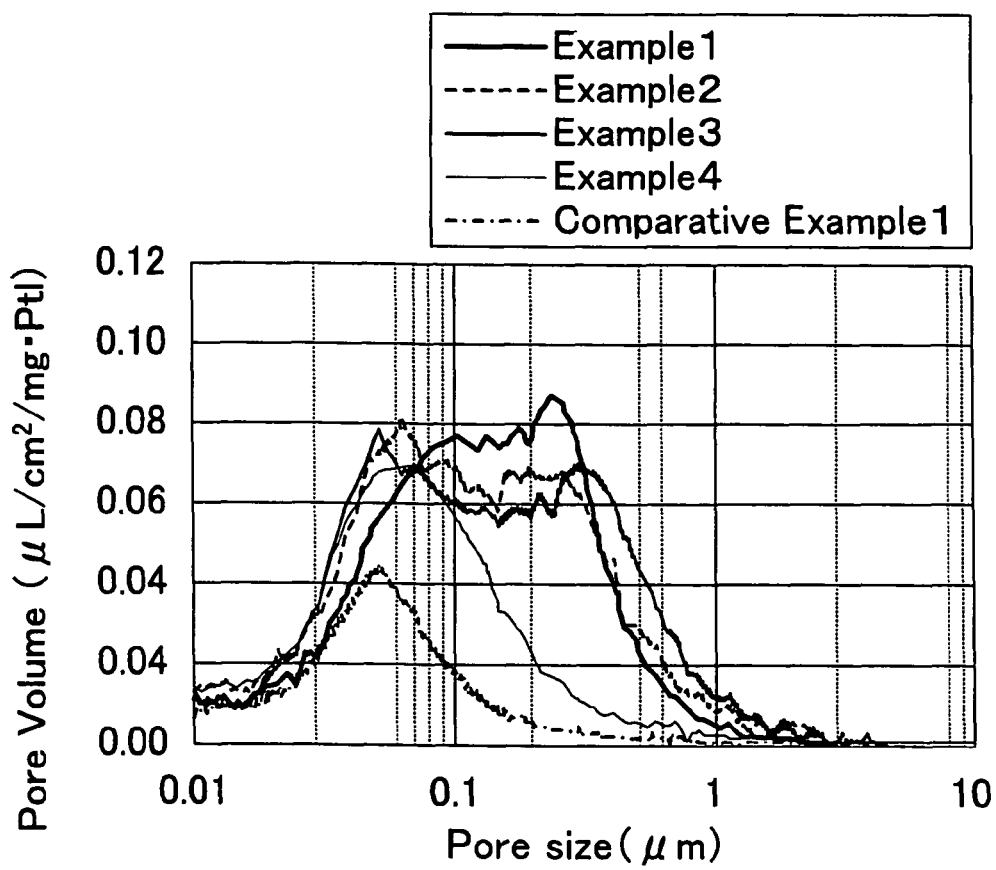
FIG. 2 is a figure showing a pore distribution of each sample in the Examples.

Table 2 shows, in X-ray diffraction measurement of each sample, [002] lattice plane spacing, carrier specific surface areas, electrode layer pore volumes, and terminal voltages. FIG. 2 shows a pore distribution of each sample. In addition, the pore volume was measured by a mercury porosimeter. Furthermore, the terminal voltage was measured under the conditions of cell temperature of 70° C. (degrees Celsius), gas utilization rate 50%, relative humidity 70%, and pressure 100 KPa.

Alternatively, from the result of Example 4, because carbon black was not graphitized at the heat treatment temperature of about 1,800° C. (degrees Celsius), the initial performance of the terminal voltage was high and the reduction was large after 100 hours.

What is claimed is:

1. A membrane electrode assembly of a solid polymer electrolyte fuel cell, comprising:
    an anode electrode;
    a cathode electrode; and
    a polymer electrolyte membrane sandwiched by the electrodes;
    wherein each electrode is formed from a catalyst layer adjacent the polymer electrolyte membrane, and from a gas diffusion layer adjacent the catalyst layer, and
    wherein the catalyst layer of the cathode electrode contains a catalyst supporting particle in which a precious metal is supported on heat-treated carbon black or activated carbon subjected to heat processing at a temperature in a range of 2,500 to 3,000° C., an ion conductive material, and crystalline carbon fibers,
    wherein an amount of the crystalline carbon fibers is 20 to 60% by mass relative to an overall mass of the catalyst supporting particle, and
    wherein the catalyst layer of the cathode electrode has a pore volume for pores with a diameter in a range of 0.01 to 2.0 μm of at least 2.8 μl/cm$^2$/mg•metal, and has a pore volume for pores with a diameter in a range of 0.01 to 0.15 μm of at least 1.7 μl/cm$^2$/mg•metal.

2. The membrane electrode assembly of the solid polymer electrolyte fuel cell according to claim 1 wherein the crystalline carbon fibers are filamentous carbon fibers.

3. The membrane electrode assembly of the solid polymer electrolyte fuel cell according to claim 1 wherein, for the crystalline carbon fiber, the mean lattice plane spacing of the [002] plane is 0.69 nm or less, the fiber diameter is 0.1 to 0.5 the fiber length is 10 to 40 μm, the bulk density is 0.02 to 0.10 g/cm$^3$, the specific surface area is 5 to 20 m$^2$/g, and the specific resistance is 0.025 Ω•cm or less.

4. The membrane electrode assembly of the solid polymer electrolyte fuel cell according to claim 1 wherein the specific

TABLE 2

| | | Heat treatment | Carrier specific surface area (m$^2$/g) | | Carbon whisker | Electrode | | Terminal voltage at 1 A/cm$^2$ | |
|---|---|---|---|---|---|---|---|---|---|
| | | | | | | Pore size | Pore size | | |
| | d002 nm | temperature (Celsius) | Before heat treatment | After heat treatment | additive rate(%) | 0.01 to 0.15 micrometers | 0.01 to 2 micrometers | Initial performance | After 1000 hours |
| Example 1 | 0.344 | 2800 | 800 | 140 | 35 | 2.36 | 3.45 | 0.665 | 0.655 |
| Example 2 | 0.346 | 2500 | 800 | 155 | 35 | 2.59 | 4.37 | 0.668 | 0.655 |
| Example 3 | 0.346 | 2800 | 800 | 155 | 50 | 2.48 | 4.51 | 0.661 | 0.649 |
| Comparative Example 1 | 0.344 | 2800 | 800 | 140 | 35 | 1.14 | 1.25 | 0.512 | 0.493 |
| Comparative Example 2 | 0.350 | 1800 | 800 | 200 | 35 | 2.37 | 2.83 | 0.652 | 0.452 |

From the results in Table 2 and FIG. 2 in Examples 1 to 3, at the heat treatment temperature of 2,500° C. (degrees Celsius), graphitization of carbon black progresses, and thus initial performance of terminal voltages was high and also reductions of terminal voltages was small after 100 hours. On the other hand, in Comparative Example 1 in which no crystalline carbon fiber was added, the initial performance was low and the reduction was large after 100 hours.

surface area is 300 to 1,600 m$^2$/g before the carbon black or activated carbon is heat-treated, it is 160 m$^2$/g or less after it is heat-treated, and the reduction rate of the specific surface area before and after it is heat-treated is 80% or more.

5. The membrane electrode assembly of the solid polymer electrolyte fuel cell according to claim 1 wherein the [002] mean lattice plane spacing of the carbon black or activated carbon is 0.340 to 0.349 nm and one or two crystallization peaks exist between 24 to 28 in 2θ/degree, in the X-ray diffraction measurement.

6. The membrane electrode assembly of the solid polymer electrolyte fuel cell according to claim 1 wherein the precious metal is platinum or a platinum alloy, and the support rate of the precious metal relative to overall mass of the catalyst supporting particle is 40 to 60% by mass after the support, the particle size of the supported platinum or platinum alloy is 2 to 5 nm, the specific surface area is 75 to 100 $m^2/g$, and one or two crystallization peaks exist between 24 to 28 in 2θ/degree in the X-ray diffraction measurement.

7. The membrane electrode assembly of the solid polymer electrolyte fuel cell according to claim 1 wherein the metal surface area is 40 to 120 $m^2/g$ when the precious metal supports platinum or a platinum alloy.

* * * * *